United States Patent
Swaffield et al.

(10) Patent No.: US 12,491,035 B2
(45) Date of Patent: Dec. 9, 2025

(54) ELECTROSURGICAL SYSTEM WITH CUSTOMISED CONTROL

(71) Applicant: GYRUS MEDICAL LIMITED, Cardiff (GB)

(72) Inventors: Mathew Swaffield, Cardiff (GB); Richard Hoodless, Cardiff (GB)

(73) Assignee: GYRUS MEDICAL LIMITED, Cardiff (GB)

( * ) Notice: Subject to any disclaimer, the term of this patent is extended or adjusted under 35 U.S.C. 154(b) by 385 days.

(21) Appl. No.: 17/203,892

(22) Filed: Mar. 17, 2021

(65) Prior Publication Data
US 2021/0338343 A1 Nov. 4, 2021

(30) Foreign Application Priority Data
Apr. 30, 2020 (GB) .................... 2006417

(51) Int. Cl.
| | | |
|---|---|---|
| *A61B 18/12* | (2006.01) | |
| *A61B 18/14* | (2006.01) | |
| *A61B 34/00* | (2016.01) | |
| A61B 17/00 | (2006.01) | |
| A61B 18/00 | (2006.01) | |

(52) U.S. Cl.
CPC .......... *A61B 34/25* (2016.02); *A61B 18/1206* (2013.01); *A61B 18/1402* (2013.01); *A61B 2017/00221* (2013.01); *A61B 2017/00225* (2013.01); *A61B 2017/00973* (2013.01); *A61B 2018/00607* (2013.01); *A61B 2018/00916* (2013.01); *A61B 2018/00928* (2013.01)

(58) Field of Classification Search
CPC . A61B 34/25; A61B 18/1206; A61B 18/1402; A61B 2017/00221; A61B 2017/00225; A61B 2017/00973; A61B 2018/00916; A61B 2018/00928
See application file for complete search history.

(56) References Cited

U.S. PATENT DOCUMENTS 5,468,240 A * 11/1995 Gentelia ................. A61B 18/14
606/49
5,904,681 A * 5/1999 West, Jr. .............. A61B 18/148
606/41

(Continued)

FOREIGN PATENT DOCUMENTS

| EP | 2 578 172 A2 | 4/2013 |
|---|---|---|
| EP | 3355809 B1 | 10/2019 |

(Continued)

OTHER PUBLICATIONS

Jul. 19, 2022 Office Action issued in Japanese Patent Application No. 2021-073900.

(Continued)

*Primary Examiner* — Sean W Collins
(74) *Attorney, Agent, or Firm* — Oliff PLC (57) ABSTRACT

The present disclosure relates to an electrosurgical system for controlling an electrosurgical instrument and in particular, to an electrosurgical system which can be configured, by a user, to split control functions between a plurality of control devices such that each device is configured to exclusively control a function of an electrosurgical instrument.

17 Claims, 6 Drawing Sheets

(56) References Cited

U.S. PATENT DOCUMENTS

| | | | | |
|---|---|---|---|---|
| 2005/0251228 A1* | 11/2005 | Hamel | ................... | A61B 90/70 |
| | | | | 607/60 |
| 2008/0262476 A1* | 10/2008 | Krause | ............. | A61B 17/32002 |
| | | | | 606/34 |
| 2011/0106068 A1* | 5/2011 | Horvath | ................. | H01H 21/26 |
| | | | | 606/1 |
| 2017/0007750 A1* | 1/2017 | Woolford | ................ | A61M 1/73 |
| 2020/0038125 A1* | 2/2020 | Farlow | ................... | A61B 34/30 |
| 2020/0078111 A1* | 3/2020 | Oberkircher | ........... | A61B 50/13 |

FOREIGN PATENT DOCUMENTS

| | | |
|---|---|---|
| GB | 2582318 A | 9/2020 |
| JP | H11-318935 A | 11/1999 |

OTHER PUBLICATIONS

Feb. 8, 2022 Office Action issued in German Patent Application No. 10 2021 110 032.1.
Oct. 28, 2020 Search Report issued in British Patent Application No. 2006417.6.
Jan. 10, 2023 Office Action issued in Japanese Patent Application No. 2021-073900.
Nov. 9, 2023 Office Action issued in British Patent Application No. 2006417.6.

* cited by examiner

ELECTROSURGICAL SYSTEM WITH CUSTOMISED CONTROL

FIELD OF DISCLOSURE

The present disclosure relates to an electrosurgical system for controlling an electrosurgical instrument and in particular, to an electrosurgical system which can be configured, by a user, to split control functions between a plurality of control devices such that each device is configured to control exclusively a function of an electrosurgical instrument.

BACKGROUND

Electrosurgical instruments provide advantages over traditional surgical instruments in that they can be used for coagulation and tissue sealing purposes. One such prior art arrangement is known from U.S. Pat. No. 5,904,681, which describes a surgical instrument including a mechanical cutting portion, such as a rotary blade or burr, and a radio frequency (RF) cutting and/or cauterizing portion comprising an electrosurgical instrument which operates in bipolar mode.

An electrosurgical instrument or electrosurgical device can be controlled by an external driver or generator. EP 2,578,172 discloses a generator to generate a drive signal to a surgical device. The generator includes an ultrasonic generator module to generate a first drive signal to drive an ultrasonic device, an electrosurgery/radio frequency (RF) generator module to generate a second drive signal to drive an electrosurgical device, and a footswitch coupled to each of the ultrasonic generator module and the electrosurgery/RF generator module. The footswitch is configured to operate in a first mode when the ultrasonic device is coupled to the ultrasonic generator module and the footswitch is configured to operate in a second mode when the electrosurgical device is coupled to the electrosurgery/RF generator module. The generator further includes a user interface to provide feedback in accordance with the operation of any one of the ultrasonic device and the electrosurgical device in accordance with a predetermined algorithm.

SUMMARY OF DISCLOSURE

Embodiments of the present invention provide an improved electrosurgical system for controlling the functions of an electrosurgical instrument connected to the electrosurgical system via a handpiece. The electrosurgical instrument is capable of different operations, including mechanical cutting of tissue, and electrosurgical ablation, sealing and/or coagulation of tissue, with mechanical cutting and electrosurgical ablation, sealing or coagulation of tissue capable of taking place simultaneously.

The said operations or functions of the electrosurgical instrument can be controlled by the handpiece which holds the electrosurgical instrument, a footswitch or a combination of both. Users often have an inherent preference for controlling the electrosurgical instrument using a handpiece or footswitch based on the user's experience, training or current system used.

The inventors have recognised that it is also possible that the users require a split of the RF electrosurgery and mechanical shaving functions between the handpiece and the footswitch, such that each of the handpiece and the footswitch controls a dedicated function of the electrosurgical instrument. The inventors have recognised the need for an improved electrosurgical system which allows for the different control combinations to be accessed in a safe and effective way for any given user.

According to an aspect of the invention, an electrosurgical system comprises an electrosurgical generator having a user interface, the electrosurgical generator operable to configure, via the user interface, a plurality of control devices connected, in use, to the generator, wherein the electrosurgical generator is operable in a first mode to assign, via the user interface, respective control functions to each of the plurality of control devices such that each device is configured to exclusively control a function of an electrosurgical instrument connected to the electrosurgical generator; the system further comprising a handpiece for holding the electrosurgical instrument, wherein the handpiece is one of the plurality of control devices connected, in use, to the electrosurgical generator.

Advantageously, the electrosurgical system of the present invention enables a user to assign respective control functions to a plurality of control devices in a single configuration mode. This is an improvement over prior art systems which only enable one control device to be selected for assigning control functions to the selected control device. A key advantage of the electrosurgical system of the present invention is that the control functions can be split between multiple control devices, thereby enabling a user to use a combination of control devices, for example a handpiece and a footswitch, for controlling an electrosurgical instrument.

According to another aspect of the invention, a method of operating an electrosurgical system for controlling an electrosurgical instrument is provided, the method comprising: selecting, via a user interface on an electrosurgical generator, a first mode of operation for the electrosurgical generator; assigning, via the user interface on the electrosurgical generator, respective control functions to each of a plurality of control devices connected to the electrosurgical generator such that each control device is configured to exclusively control a function of an electrosurgical instrument connected to the electrosurgical generator via a handpiece.

According to a further aspect of the invention an electrosurgical instrument for use in the electrosurgical system of the invention is provided, wherein the electrosurgical instrument is configured to perform at least one of an electrosurgery function and a shaving function.

BRIEF DESCRIPTION OF THE DRAWINGS

The teachings of this disclosure will be discussed, by way of non-limiting examples, with reference to the accompanying drawings, in which.

DETAILED DESCRIPTION

An electrosurgical instrument can be used to perform different operations, including mechanical cutting of tissue, and RF electrosurgical ablation, sealing and/or coagulation of tissue, with mechanical cutting and RF electrosurgical ablation, sealing or coagulation of tissue capable of taking place simultaneously.

Figure 1:
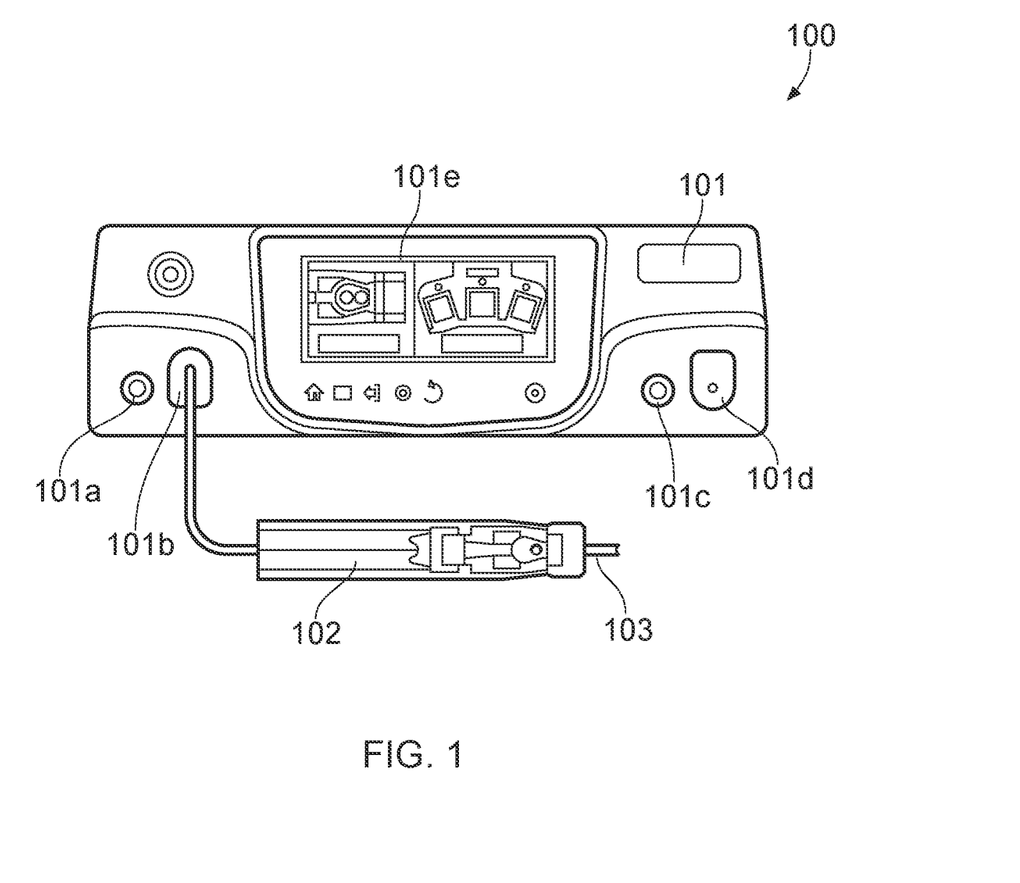
FIG. 1 shows an embodiment of an electrosurgical system according to the present invention.

Embodiments of the present invention relate to the improvement of an electrosurgical system 100 for controlling an electrosurgical instrument as described above. FIG. 1 shows an embodiment of an electrosurgical system 100 according to the present invention. The electrosurgical system comprises an electrosurgical generator 101. The electrosurgical generator 101 comprises inputs (101*a-d*) for connecting control devices. The electrosurgical generator 101 comprises a graphical user interface 101*e*, which may be, for example, a touch screen. The electrosurgical system comprises a handpiece 102 connected to the electrosurgical generator. The handpiece 102 is configured to hold the electrosurgical instrument 103 for use in treating a patient. The handpiece 102 is always connected to the electrosurgical generator 101 in operation, although it is disconnectable therefrom to allow other types of electrosurgical handpiece or electrosurgical instrument to be connected to the electrosurgical generator. The handpiece 102 comprises control buttons (not shown) for controlling RF electrosurgery and mechanical shaving functions of the electrosurgical instrument 103.

Figure 2:
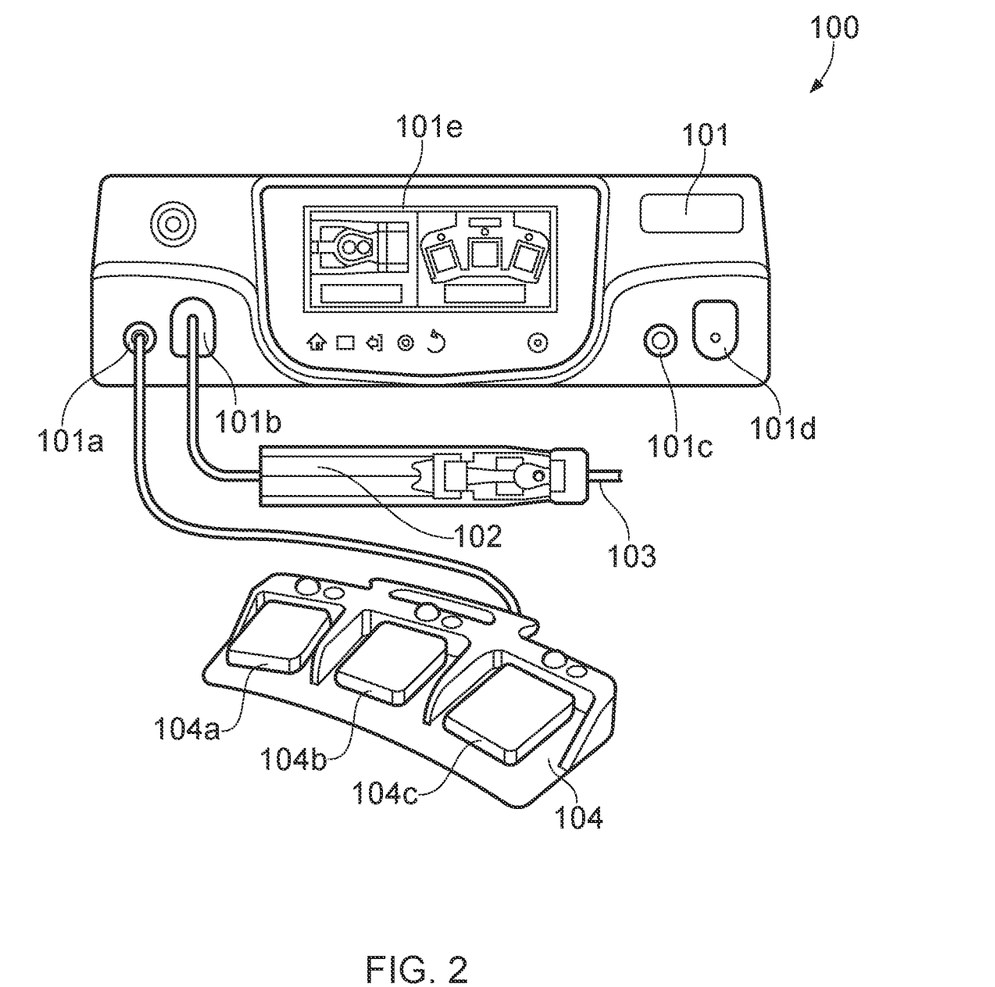
FIG. 2 shows another embodiment of an electrosurgical system according to the present invention.

As shown in FIG. 2, the electrosurgical system 100 may optionally comprise a footswitch 104. The footswitch 104 can be connected to the electrosurgical generator 101 during operation and can also be used to control a function of the electrosurgical instrument 103. The footswitch 104 comprises controls (104*a-c*), for example, pedals (104*a-c*) for controlling RF electrosurgery and mechanical shaving functions of the electrosurgical instrument 103.

FIGS. 3*a*-3*d* are illustrative examples of a basic mode of operation of the electrosurgical system 100. The basic mode of operation is accessed via a menu in the user interface 101*e*.

Figure 3A:
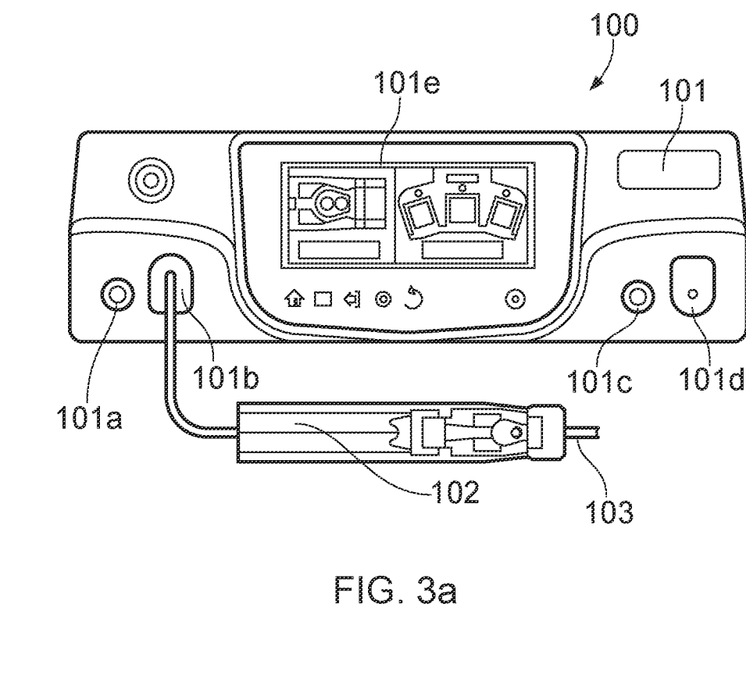
FIG. 3a shows an illustrative example of a basic mode of operation for the electrosurgical generator of an electrosurgical system with only the handpiece connected to the electrosurgical generator.
Figure 3B:
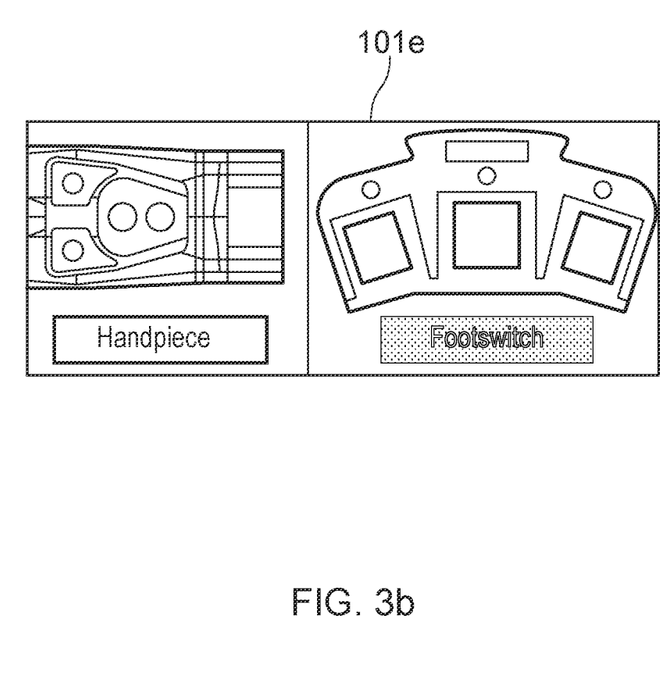
FIG. 3b shows the display on the user interface for basic mode of operation of the electrosurgical system of FIG. 3b.

As seen in FIG. 3*a*, in a first implementation of the basic mode of operation, if only a handpiece 102 is connected, then only the handpiece controls are used for controlling the electrosurgery and mechanical shave functions of the electrosurgical instrument 103. This basic mode of operation would be preferred, for example, by a handpiece trained user. In this case, there is no selection choice of control devices because only the handpiece 102 is connected to the electrosurgical generator 101. In this case, as shown in FIG. 3*b*, the user interface 101*e* would display, by default, that the handpiece 102 has been recognised.

Figure 3C:
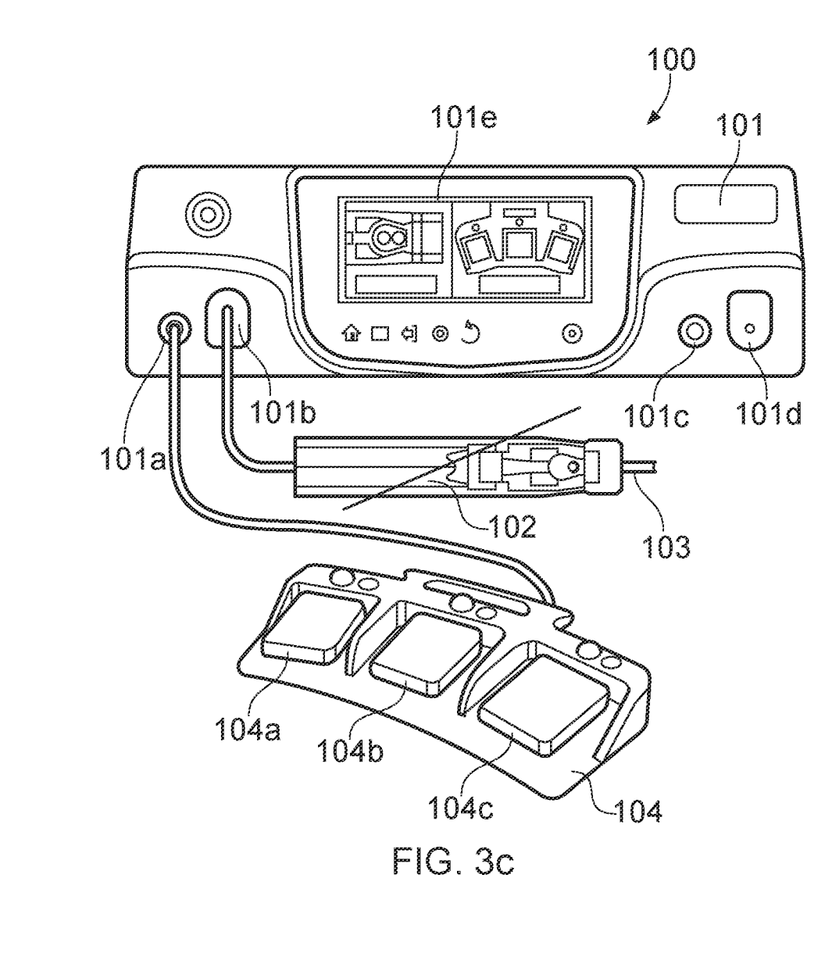
FIG. 3c shows an illustrative example of a basic mode of operation for the electrosurgical generator of an electrosurgical system with a handpiece and a footswitch connected to the electrosurgical generator wherein the footswitch selected.
Figure 3D:
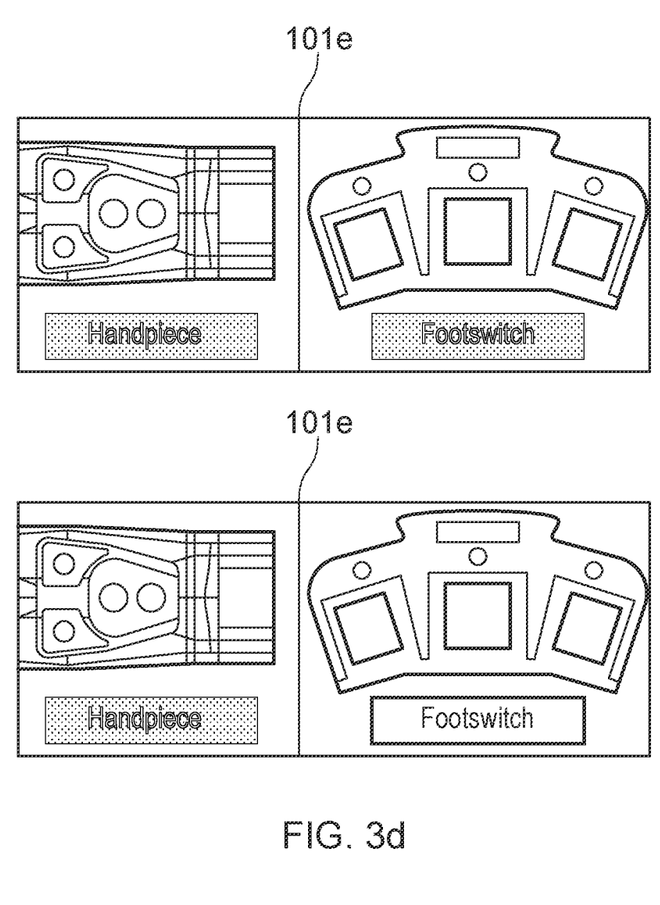
FIG. 3*d* shows the display on the user interface for the basic mode of operation for the electrosurgical generator of the electrosurgical system of FIG. 3*c*.

FIG. 3*c* is an illustrative example of another implementation of the basic mode of operation of the electrosurgical system, where both the handpiece 102 and footswitch 104 are connected to the electrosurgical generator 101. In this case also, the user has accessed the basic mode of operation via a menu in the user interface 101*e*. In the basic mode of operation, the user first selects a control device 102 or 104. As seen in FIG. 3*d* the control information on the user interface 101*e* would be greyed out or blocked until the control device, in this case, the footswitch 104 is selected. The user then assigns, via the user interface 101*e*, control functions to the selected control device.

FIGS. 4*a-d* show an electrosurgical system 100 according to an embodiment of the present invention. In particular, these figures show an implementation of an advanced mode of operation as provided by the user interface 101*e*.

Figure 4A:
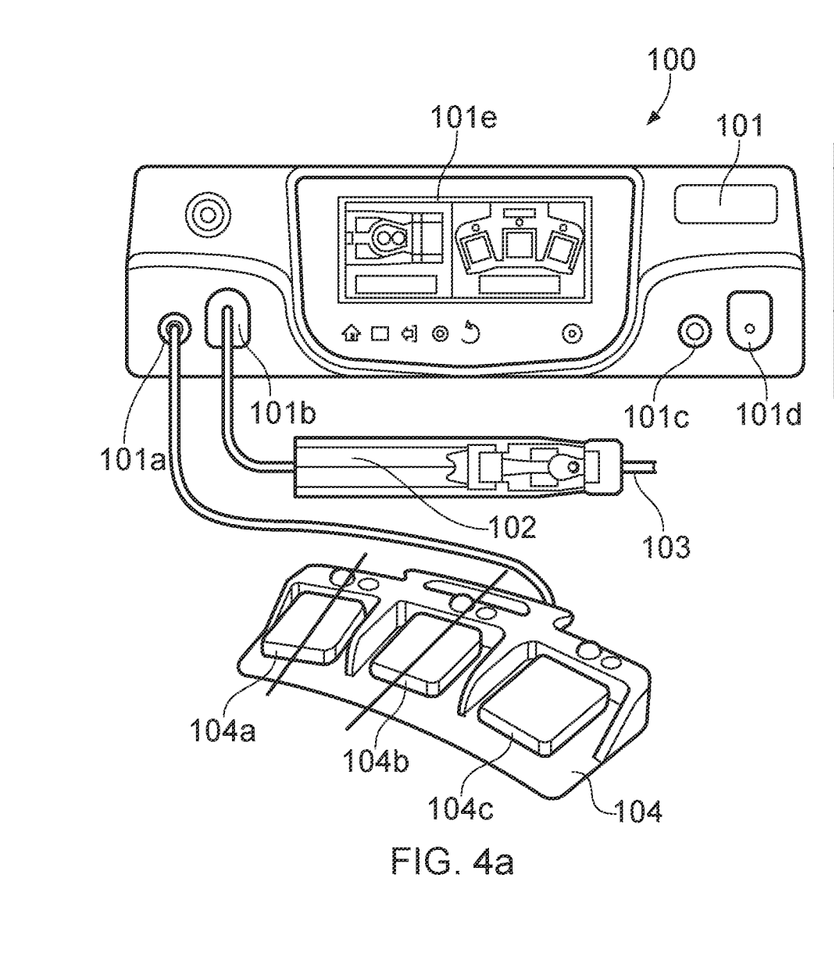
FIG. 4*a* shows an implementation of an electrosurgical system comprising a electrosurgical generator in an advanced mode of operation according to the present invention.
Figure 4B:
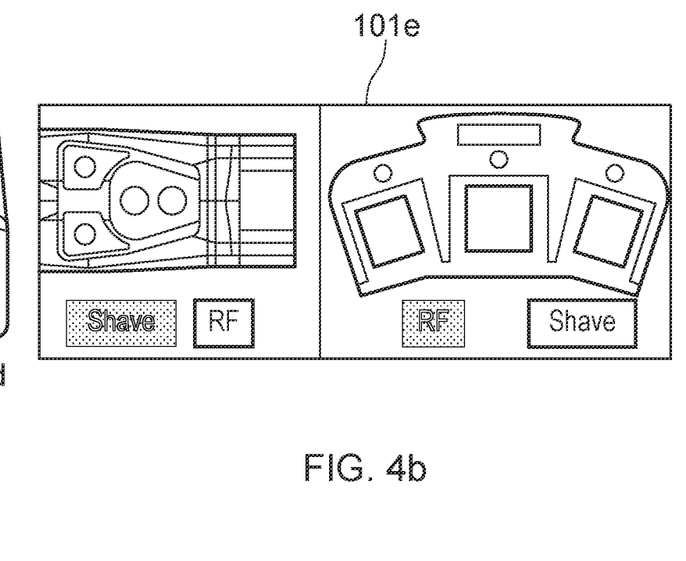
FIG. 4*b* shows the display of the user interface for the advanced mode of operation for the electrosurgical generator of electrosurgical system of FIG. 4*a*.
Figure 4C:
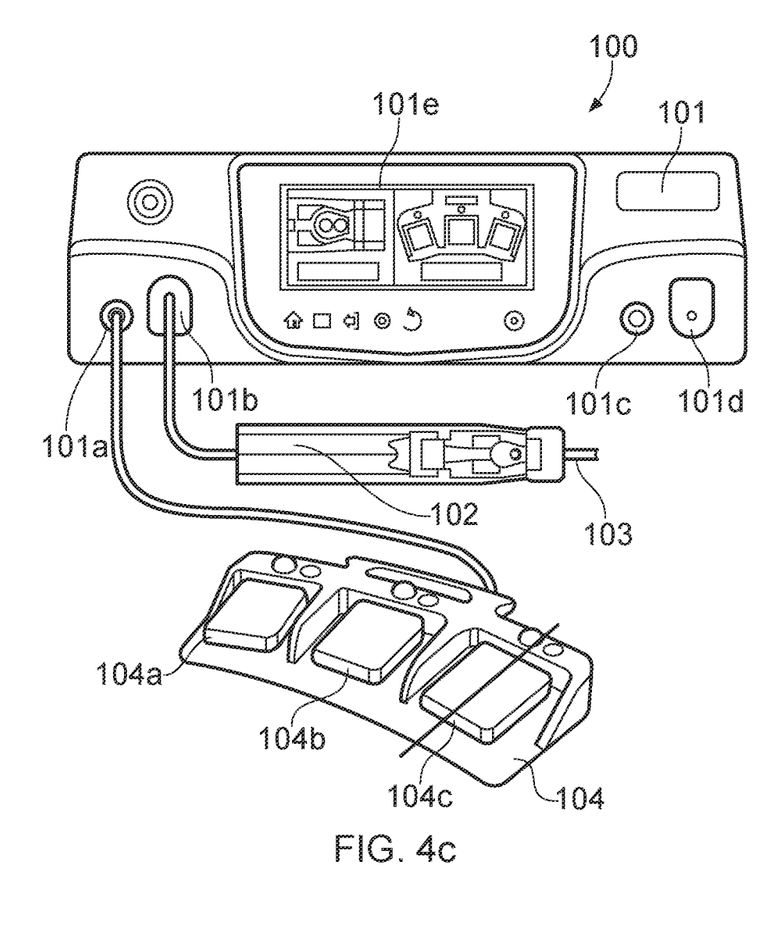
FIG. 4*c* shows another implementation of an electrosurgical system comprising a electrosurgical generator in an advanced mode of operation according to the present invention.

As shown in FIGS. 4*a*, 4*c*, the electrosurgical system 100 has both the handpiece 102 and footswitch 104 connected to the electrosurgical generator 101. The user interface 101*e* in this case is configured to have an advanced mode of operation. The advanced mode of operation is accessed via a menu on the user interface 101*e*. The advanced mode of operation is an improvement over the basic mode of operation explained earlier.

Figure 4D:
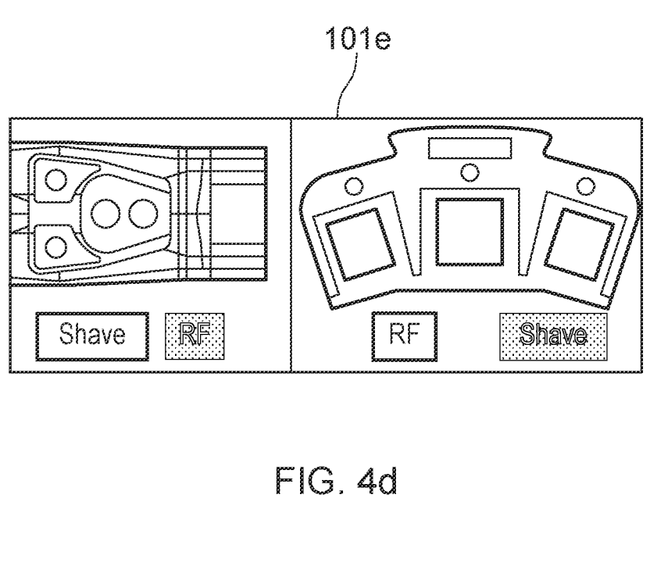
FIG. 4*d* shows the display of the user interface for the advanced mode of operation for the electrosurgical generator of the electrosurgical system of FIG. 4*c*.

The advanced mode of operation enables a user to configure the electrosurgical generator for assigning control functions to a plurality of control devices connected to the electrosurgical generator 101, in this case, to both the handpiece 102 and the footswitch 104 (see FIGS. 4*c*, 4*d*). In particular, the advanced mode of operation enables the user to customise a split of control functions, for example, a split of the RF electrosurgery and mechanical shaving functions, across both the handpiece 102 and the footswitch 104, such that each control device is configured to exclusively control a function of the electrosurgical instrument 103.

FIG. 4*a* shows a first implementation of the advanced mode of operation. In this case both the handpiece 102 and the footswitch 104 are connected to the electrosurgical generator 101. The user enters the advanced mode of operation via a menu on the user interface 101*e*. In this configuration, as shown in FIG. 4*b*, the user assigns, via the user interface, only RF electrosurgery controls to the handpiece 102 and only mechanical shaving controls to the footswitch 104. This assignment locks out or disables mechanical shaving controls on the handpiece 102 and locks out or disables RF electrosurgery controls on the footswitch 104. That is, the handpiece 102 is now configured to control only the RF electrosurgery function of the electrosurgical instrument 103, whereas the footswitch 104 is configured to control only the mechanical shaving function of the electrosurgical instrument 103.

FIG. 4*c* shows a second implementation of the advanced mode of operation. In this case both the handpiece 102 and the footswitch 104 are connected to the electrosurgical generator 101. The user enters the advanced mode of operation via a menu on the user interface 101*e*. In this configuration, as shown in FIG. 4*d*, the user assigns via the user interface 101*e* only mechanical shave controls to the handpiece 102 and only RF electroshaving controls to the footswitch 104. This assignment locks out or disables RF electrosurgery controls on the handpiece 102 and mechanical shaving controls on the footswitch 104. That is, the handpiece 102 is now configured to control only the mechanical shaving function of the electrosurgical instrument 103, whereas the footswitch 104 is configured to control only the RF electrosurgery function of the electrosurgical instrument 103.

In a further embodiment, where there are multiple users using the electrosurgical system, the advanced mode of operation may also enable the storing of user presets with corresponding assignments of control functions to the control devices as defined by the respective user.

In another embodiment, the selection of the customised RF electrosurgery and mechanical shaving split controls could be controlled by a mode button or function from the handpiece or footswitch.

In another embodiment, the customisation of control functions, as enabled by the advanced mode of operation, could allow for full lock out or disabling of one function of the electrosurgical instrument—for example, a full lock out of RF electrosurgery or a full lock out of mechanical shaving. This may be particularly useful in the case where a user wishes to avoid accidental activation of the locked out function, such as near sensitive parts of the operated area.

In another embodiment of the invention, the electrosurgical system 100 is configured to operate in an automatic priority mode, wherein the last control device to be connected to the electrosurgical generator 101 takes priority when it comes to selecting a control device for assignment of control functions. For example, in the case of a handpiece 102 being already connected to the control device 101 and footswitch 104 subsequently connected to the electrosurgical generator device 101, the footswitch 104 is automatically selected first by the electrosurgical generator 101 for assignment of control functions.

It will be appreciated that various modifications, whether by way of addition, deletion and/or substitution, may be made to all of the above described embodiments to provide further embodiments, any and/or all of which are intended to be encompassed by the appended claims.

The invention claimed is:

1. An electrosurgical system comprising:
   an electrosurgical generator having a user interface; and
   a plurality of control devices configured to be connected, in use, to the electrosurgical generator, the plurality of control devices including:
     a handpiece for holding an electrosurgical instrument that is configured to be connected to the electrosurgical generator at a first position and configured to perform at least one of an electrosurgery function and a mechanical cutting function, and
     a second control device that is configured to be connected to the electrosurgical generator at a second position that is provided at a different position than the first position;
   wherein in a first mode, the electrosurgical generator is configured to:
   assign, in response to a first user selection via the user interface, a first assigned control function being one of: an electrosurgery control function and a mechanical cutting control function, to one of: the handpiece and the second control device of the plurality of control devices,
   assign, in response to a second user selection via the user interface, a second assigned control function being another one of: the electrosurgery control function and the mechanical cutting control function, to another one of: the handpiece and the second control device of the plurality of control devices, and
   upon assigning one of: the electrosurgery control function and the mechanical cutting control function, to the handpiece, locking out the first assigned control function from the second control device of the plurality of control devices, and
   upon assigning another of: the electrosurgery control function and the mechanical cutting control function, to the second control device of the plurality of control devices, locking out the second assigned control function from the handpiece, such that, in use, the first assigned control function is exclusively controlled by the handpiece and locked out of the second control device of the plurality of control devices in accordance with the first user selection, and the second assigned control function is exclusively controlled by the second control device and locked out of the handpiece in accordance with the second user selection.

2. An electrosurgical system according to claim 1, wherein the second control device is a footswitch configured to be connected, in use, to the electrosurgical generator.

3. An electrosurgical system according to claim 2, wherein the electrosurgical generator is configured to assign, in the first mode via the user interface, the electrosurgery control function to the handpiece and the mechanical cutting control function to the footswitch such that the handpiece is configured to exclusively control the electrosurgery function of the electrosurgical instrument and the footswitch is configured to exclusively control the mechanical cutting function of the electrosurgical instrument.

4. An electrosurgical system according to claim 2, wherein the electrosurgical generator is configured to assign, in the first mode via the user interface, the mechanical cutting control function to the handpiece and the electrosurgery control function to the footswitch such that the handpiece is configured to exclusively control the mechanical cutting function of the electrosurgical instrument and the footswitch is configured to exclusively control the electrosurgery function of the electrosurgical instrument.

5. An electrosurgical system according to claim 2, wherein the footswitch is configured to be connected to the electrosurgical generator using a wired connection.

6. An electrosurgical system according to claim 2, wherein the footswitch is configured to be connected to the electrosurgical generator using a wireless connection.

7. An electrosurgical system according to claim 1, wherein the electrosurgical generator is further configured to store, in the first mode, a plurality of user presets having respective assignment configurations for assigning control functions to each of the plurality of control devices.

8. An electrosurgical system according to claim 1, wherein the electrosurgical generator is further configured to disable, in the first mode via the user interface, at least one control function on one or more of the plurality of control devices.

9. An electrosurgical system according to claim 1, wherein the handpiece has buttons for controlling the electrosurgery function and/or the mechanical cutting function of the electrosurgical instrument.

10. An electrosurgical system according to claim 2, wherein the footswitch has pedals for controlling the electrosurgery function and/or the mechanical cutting function of the electrosurgical instrument.

11. An electrosurgical system according to claim 1, wherein the electrosurgical generator is further configured to, in a second mode via the user interface:
   select one control device of the plurality of control devices connected, in use, to the electrosurgical generator via the user interface; and assign one or more control functions to the selected control device via the user interface.

12. An electrosurgical system according to claim 1, wherein the electrosurgical generator is further configured to, in a third mode via the user interface:
    automatically select the most recent control device connected to the electrosurgical generator; and
    assign control functions to the selected control device via the user interface.

13. An electrosurgical system according to claim 1, and further comprising the electrosurgical instrument configured to perform at least one of the electrosurgery function and the mechanical cutting function.

14. The electrosurgical system of claim 1, wherein the electrosurgical system is configured to operate in an automatic priority mode, wherein one of the handpiece or the second control device most recently connected is automatically selected as a control device for assignment of control functions.

15. An electrosurgical instrument configured for use in an electrosurgical system comprising:
    an electrosurgical generator having a user interface, and
    a plurality of control devices configured to be connected, in use, to the electrosurgical generator, the plurality of control devices including:
        a handpiece for holding an electrosurgical instrument that is configured to be connected to the electrosurgical generator at a first position, perform at least one of an electrosurgery function and a mechanical cutting function, and
        a second control device that is configured to be connected to the electrosurgical generator at a second position that is provided at a different position than the first position;
    wherein in a first mode, the electrosurgical generator is configured to:
        assign, in response to a first user selection via the user interface, a first assigned control function being one of: an electrosurgery control function and a mechanical cutting control function, to one of: the handpiece and the second control device of the plurality of control devices,
        assign, in response to a second user selection via the user interface, a second assigned control function being another one of: the electrosurgery control function and the mechanical cutting control function, to another one of: the handpiece and the second control device of the plurality of control devices, and
        upon assigning one of: the electrosurgery control function and the mechanical cutting control function, to the handpiece, locking out the first assigned control function from the second control device of the plurality of control devices, and
        upon assigning another of: the electrosurgery control function and the mechanical cutting control function, to the second control device of the plurality of control devices, locking out the second assigned control function from the handpiece, such that, in use, the first assigned control function is exclusively controlled by the handpiece and locked out of the second control device of the plurality of control devices in accordance with the first user selection, and the second assigned control function is exclusively controlled by the second control device and locked out of the handpiece in accordance with the second user selection.

16. A method of operating an electrosurgical system for controlling an electrosurgical instrument that is configured to perform at least one of an electrosurgery function and a mechanical cutting function, the method comprising:
    selecting, via a user interface on an electrosurgical generator, a first mode of operation for the electrosurgical generator; and
    assigning, in response to a first user selection via the user interface, a first assigned control function being one of: an electrosurgery control function and a mechanical cutting control function, to one of: a handpiece and a second control device of a plurality of control devices,
    assigning, in response to a second user selection via the user interface, a second assigned control function being another one of: the electrosurgery control function and the mechanical cutting control function, to another one of: the handpiece and the second control device of the plurality of control devices, and
    upon assigning one of: the electrosurgery control function and the mechanical cutting control function, to the handpiece, locking out the first assigned control function from the second control device of the plurality of control devices, and
    upon assigning another of: the electrosurgery control function and the mechanical cutting control function, to the second control device of the plurality of control devices, locking out the second assigned control function from the handpiece, such that, in use, the first assigned control function is exclusively controlled by the handpiece and locked out of the second control device of the plurality of control devices in accordance with the first user selection, and the second assigned control function is exclusively controlled by the second control device and locked out of the handpiece in accordance with the second user selection.

17. The electrosurgical instrument of claim 15, connected to the electrosurgical system.

* * * * *